(12) United States Patent
Low et al.

(10) Patent No.: US 7,386,705 B2
(45) Date of Patent: Jun. 10, 2008

(54) METHOD FOR ALLOCATING PROCESSOR RESOURCES AND SYSTEM FOR ENCRYPTING DATA

(75) Inventors: Arthur John Low, Chelsea (CA); Neil Farquhar Hamilton, Kanata (CA); Hafid Zaabab, Ottawa (CA)

(73) Assignee: MOSAID Technologies Inc., Kanata, Ontario (CA)

( * ) Notice: Subject to any disclaimer, the term of this patent is extended or adjusted under 35 U.S.C. 154(b) by 539 days.

(21) Appl. No.: 10/228,933

(22) Filed: Aug. 27, 2002
(Under 37 CFR 1.47)

(65) Prior Publication Data
US 2004/0044898 A1 Mar. 4, 2004

(51) Int. Cl.
*G06F 15/82* (2006.01)
(52) U.S. Cl. ............................................. 712/34
(58) Field of Classification Search ............. 712/34
See application file for complete search history.

(56) References Cited

U.S. PATENT DOCUMENTS

| | | | |
|---|---|---|---|
| 4,797,848 A | 1/1989 | Walby | |
| 5,001,661 A | 3/1991 | Corleto et al. | |
| 5,101,431 A | 3/1992 | Even | |
| 5,179,665 A | 1/1993 | Roslund et al. | |
| 5,210,710 A | 5/1993 | Omura | |
| 5,313,530 A | 5/1994 | Iwamura | |
| 5,321,752 A | 6/1994 | Iwamura et al. | |
| 5,398,284 A | 3/1995 | Koopman, Jr. et al. | |
| 5,414,651 A | 5/1995 | Kessels | |
| 5,499,299 A | 3/1996 | Takenaka et al. | |
| 5,513,133 A | 4/1996 | Cressel et al. | |
| 5,600,720 A | 2/1997 | Iwamura et al. | |
| 5,623,683 A | 4/1997 | Pandya | |
| 5,666,419 A | 9/1997 | Yamamoto et al. | |
| 5,706,489 A * | 1/1998 | Chi et al. ................... | 712/228 |
| 5,724,280 A | 3/1998 | Davis | |
| 5,742,530 A * | 4/1998 | Gressel et al. .............. | 708/491 |
| 5,848,159 A | 12/1998 | Collins et al. | |
| 5,867,412 A | 2/1999 | Suh | |
| 5,923,871 A | 7/1999 | Gorshtein et al. | |
| 5,982,900 A | 11/1999 | Ebihara et al. | |
| 5,987,489 A | 11/1999 | Monier | |
| 6,026,421 A | 2/2000 | Sabin et al. | |
| 6,088,453 A | 7/2000 | Shimbo | |

(Continued)

OTHER PUBLICATIONS

Heuring, Vincent and Jordan, Harry. "Computer Systems Design and Architecture". Addison-Wesley, 1997.*

(Continued)

*Primary Examiner*—Eddie P Chan
*Assistant Examiner*—Robert E Fennema
(74) *Attorney, Agent, or Firm*—Hamilton, Brook, Smith & Reynolds, P.C.

(57) ABSTRACT

An apparatus for calculating and encryption of data has a multistage processing array and a plurality of registers. Each register has a status bit which indicates a "go" or "done" condition when the register is loaded. This enables the process array, after completion of a processing cycle, to connect to a "ready" register.

13 Claims, 8 Drawing Sheets

U.S. PATENT DOCUMENTS 6,088,800 A * 7/2000 Jones et al. .................. 713/189
6,144,743 A 11/2000 Yamada et al.
6,151,393 A 11/2000 Jeong
6,363,444 B1 * 3/2002 Platko et al. ............... 710/110

OTHER PUBLICATIONS

Hamacher et al. "Computer Organization". McGraw-Hill, 1996, Fourth Edition. pp. 211-212.*

Patterson, David. Hennessy, John. "Computer Architecture: A Quantitative Approach". Morgan-Kaufmann Publishers, Inc, Second Edition. 1996. p. 131.*

Blum T., "Modular Exponentiation on Reconfigurable Hardware", *The Worcester Polytechnic Institute*, (Apr. 1999).

* cited by examiner

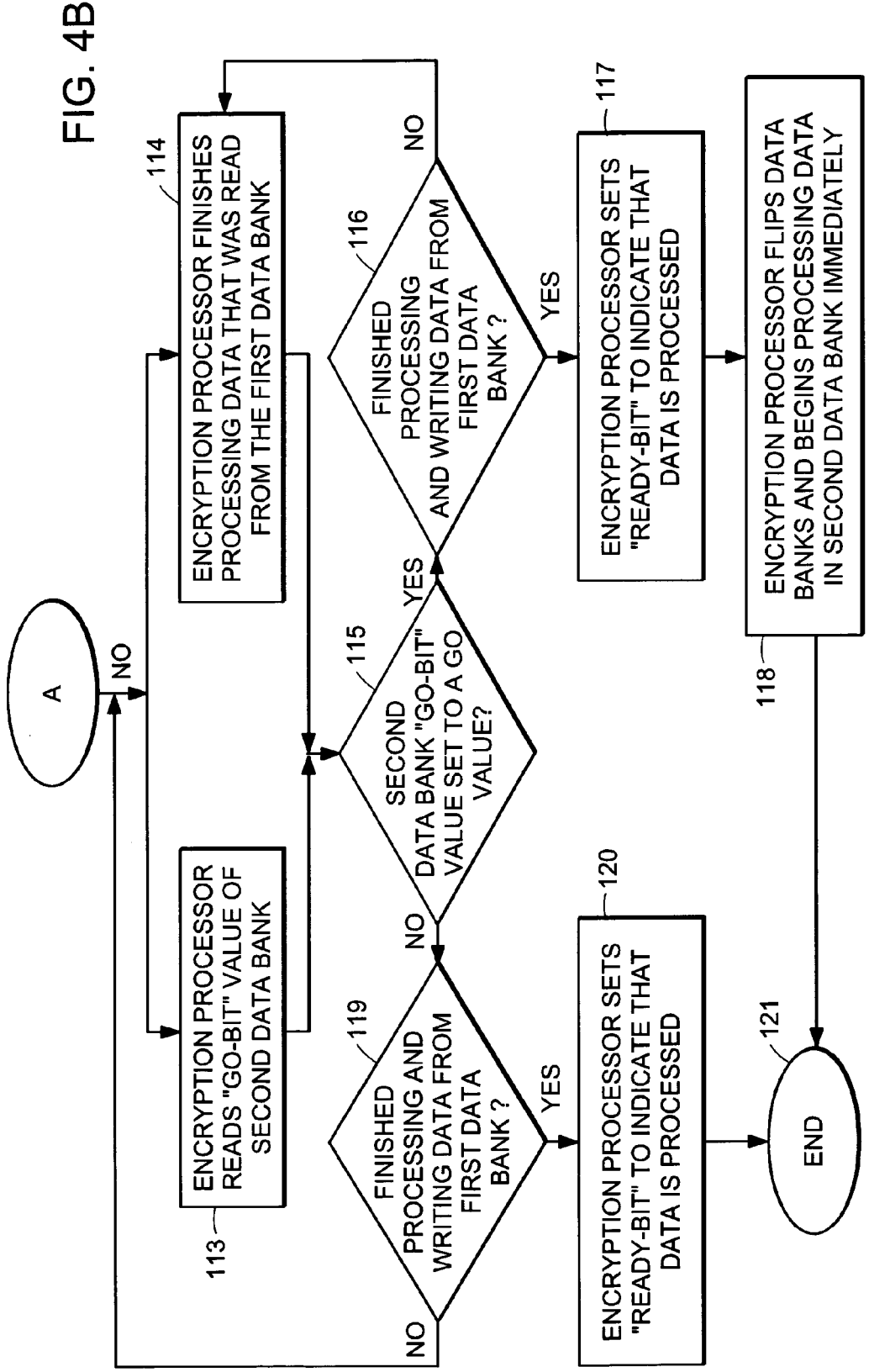

METHOD FOR ALLOCATING PROCESSOR RESOURCES AND SYSTEM FOR ENCRYPTING DATA

FIELD OF THE INVENTION

The invention relates to an apparatus for calculating and encryption, and in particular is concerned with the storage of data and forwarding to the calculating and encryption apparatus with minimal delay.

BACKGROUND OF THE INVENTION

It is becoming relatively common to exchange electronically stored documents between parties to a transaction, for instance via a widely distributed information network such as the Internet of the World Wide Web (WWW). A common problem with the Internet is a lack of secure communication channels. Thus, in order for hospitals, governments, banks, stockbrokers, and credit card companies to make use of the Internet, privacy and security must be ensured. One approach to solving the aforementioned problem uses data encryption prior to transmission. In a prior art system a host computer system is provided with an encryption unit, for example an encryption processor that is in electrical communication with at least a memory circuit for storing at least a private encryption key. When information is to be transmitted from the host computer system to a recipient via the Internet and is of a confidential nature, the information is first passed to the encryption processor for encryption using the stored private key. Typically, a same private key is used every time a data encryption operation is performed. Alternatively, an encryption key is selected from a finite set of private encryption keys that is stored in the at least a memory circuit in electrical communication with the encryption processor.

Of course, a data encryption operation that is performed by an encryption processor is a mathematical algorithm in which an input data value is the only variable value. It is, therefore, possible to optimize the encryption processor to perform a desired encryption function using a least amount of processor resources. Additionally, in the prior art encryption units the optimized encryption processor is typically separate from the microprocessor of the host computer system, because it is best optimized in this way. In use, the microprocessor polls the encryption processor to determine a status of the encryption processor before sending data for encryption. If the encryption processor returns a signal that is indicative of an "available" status, then the microprocessor writes data, for instance a hashed version of a document, into an area of the memory circuit in electrical communication with the encryption processor, for instance a memory buffer. The memory buffer is dual ported such that each one of the encryption processor and the microprocessor has the ability to read data from the buffer and to write data to the buffer. The encryption processor reads the data from the buffer, encrypts the data using a private key, and writes the processed data back into the buffer. Of course, the encryption processor must send a signal to the microprocessor to indicate that the data has been processed and is available within the buffer. Alternatively, the microprocessor polls the encryption processor to determine when the provided data has been processed and written into the buffer. Unfortunately, the microprocessor is unable to provide additional data for processing by the encryption processor until the processed data previously provided to the encryption processor has been safely read out of the buffer.

It will be obvious to one of skill in the art that the system described above is not even efficient for a system comprising a single host computer and a single encryption processor, the encryption processor being dedicated to the host computer. In fact, a single encryption processor typically supports a plurality of host computers, wherein the plurality of host computers and the encryption processor are in electrical communication, for instance via a local area network (LAN). The encryption unit provides encryption functions for every computer connected via the LAN, but not at a same time. When a microprocessor has data for encryption by the encryption processor, the microprocessor must wait until the encryption processor is available, and until all of the data that the encryption processor has previously processed has been read out of the buffer safely.

When the encryption processor indicates an "available" status, the microprocessor authenticates itself to the encryption processor and establishes a protocol for the data exchange. The encryption processor becomes dedicated to the authenticated microprocessor until such time that the data provided by the authenticated microprocessor is processed and safely read out of the buffer by the authenticated microprocessor. It is a disadvantage of the prior art system that each microprocessor of the plurality of computers must poll the encryption processor via the LAN prior to sending data thereto, in order to determine one of an "available" status and a "not-available" status of the encryption processor. Optionally, when the encryption processor is in an available state for receiving data, the encryption processor broadcasts a signal that is indicative of this available status to each microprocessor of the plurality of computers that are connected via the LAN. It is, therefore, a further disadvantage of the prior art system that the network messages exchanged between each of the plurality of host computers and the encryption processor contribute to the total volume of network data traffic. For example, if the encryption processor signs 60 documents per second, and there are 20 computers connected via the LAN, then there are approximately 1200 network messages every second to indicate that the encryption processor is available.

Prior art systems including a shared encryption processor are also known in which the encryption processor is in electrical communication with a dual ported buffer. The encryption processor and each microprocessor of the plurality of computers connected via the LAN are able to write data to and read data from the buffer. In use, a microprocessor establishes communication with the encryption processor, determines a protocol for the data exchange, and signals to the encryption processor that it is the next microprocessor for which dedicated encryption functions are requested. The microprocessor writes data for processing by the encryption processor into the buffer. When the encryption processor is available, it sends a signal to the microprocessor, which then returns a signal to the encryption processor indicating that the data in the buffer is ready for processing. Alternatively, the microprocessor polls the encryption processor to determine the ready state thereof. When the encryption processor finishes processing the data, it sends the data back to the buffer for retrieval by the microprocessor. Advantageously, the prior art system having a large enough buffer reduces delays associated with reading data into and out of the buffer. Unfortunately, the time that is required to exchange the network messages between the plurality of computers and the encryption processor to determine the status of the encryption processor is wasted time, in terms of the actual processing overhead of the encryption processor. For example, exchanging messages requires two or three processing cycles, during which time the encryption processor is not performing encryption functions. When doing 40-bit encryption, for example, which requires on the order of forty processing cycles, an approximately five percent processing bandwidth loss is incurred. Even when 128-bit encryption is performed, requiring 128 processing cycles, there is an approximately one to two percent processing loss. Since the encryption processor is typically a most expensive part of a computer network, it is highly undesirable to incur any unnecessary loss of processor bandwidth.

It would be advantageous to provide a system and a method for allocating with improved efficiency the processing resources of an encryption processor that is in communication with a plurality of computers via a LAN. Most preferably, it would be advantageous to provide a system and a method that allows the encryption processor to identify a memory storage location, in which data that are ready to be processed are stored, approximately immediately before the completion of a current processing operation. Advantageously, such a system and method allows the encryption processor to begin a next processing operation as soon as the current processing operation is completed.

SUMMARY OF THE INVENTION

In accordance with the present invention there is provided a system for encrypting data comprising:
  a multistage pipe-line processor including an array of processing stages for processing data; and,
  a memory circuit in electrical communication with the processor array, the memory circuit including:
    a first data storage area and a second data storage area for storing data for processing; and,
    a status indicator bit in each data storage area, the status indicator bit for indicating that the data stored within the data storage area is ready for processing,
  wherein prior to completing the processing of the current data within a data storage area the processor array determines a status of an indicator value for a second data storage area other than the data storage area currently being processed, such that in use upon completion of processing the data within the current data storage area and absent external communication, the processor array begins a subsequent processing operation of the data within the second data storage area in dependence upon the indicator value.

In accordance with another aspect of the invention there is provided a method for allocating processor resources comprising the steps of:
  a) writing data to a data storage area from a first client station;
  b) setting a status indicator value in the first data storage area by providing a value from the client station for indicating that the data in the first data storage area is ready to be processed by a processor;
  c) checking a status indicator value in the first data storage area to determine a set value thereof; and,
  d) connecting the processor to the first data storage area immediately after the processor is completed processing of previous data, in dependence upon the status indicator value in the first data storage area being set to a value indicative of a ready status.

BRIEF DESCRIPTION OF THE DRAWINGS

The invention will now be described with reference to the drawings in which:

FIGS. 4a and 4b together show a simplified flow diagram of a method for allocating with improved efficiency the processing resources of an encryption processor according to an embodiment of the present invention;

FIGS. 4a and 4c together show a simplified flow diagram of a method for allocating with improved efficiency the processing resources of an encryption processor according to another embodiment of the present invention;

DETAILED DESCRIPTION OF THE INVENTION

Figure 1:
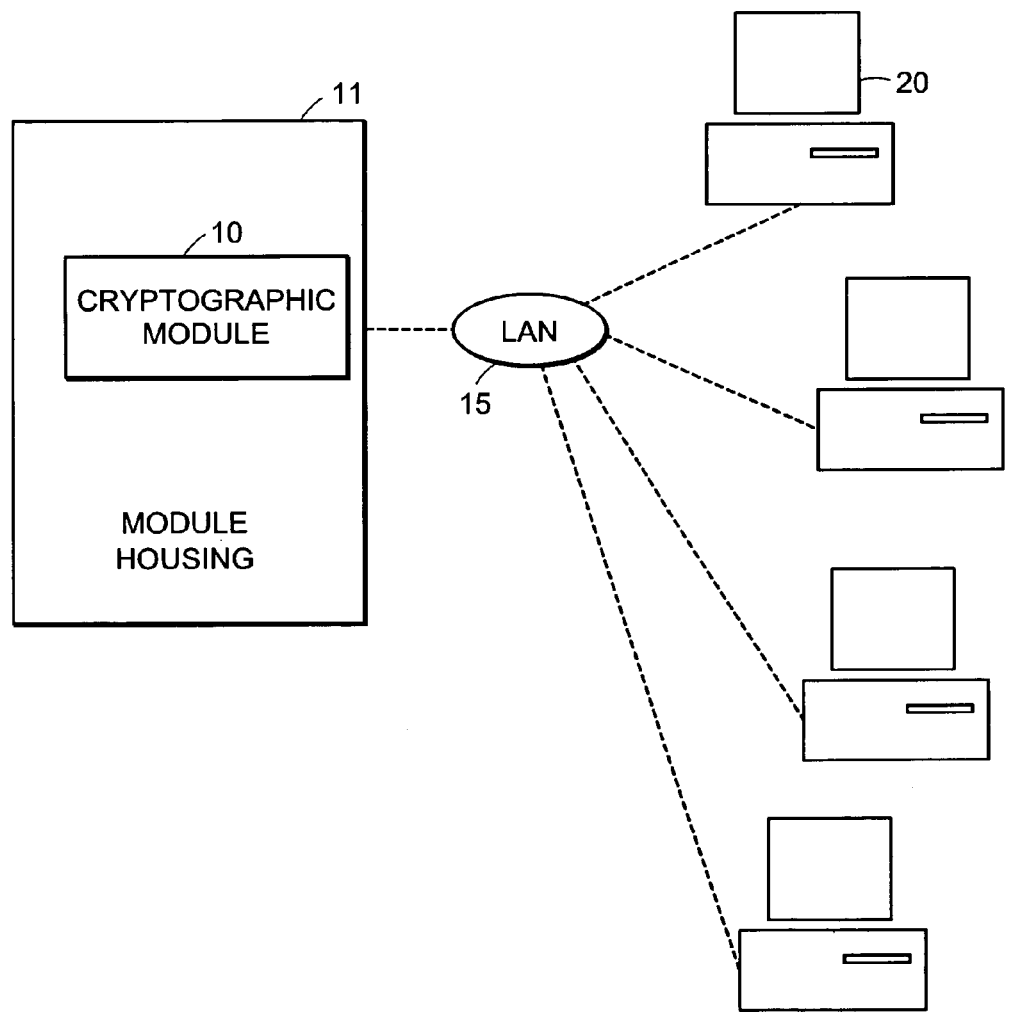
FIG. 1 shows a simplified block diagram of an encryption module in operative communication with a plurality of client stations via a local area network according to the present invention.

Referring to FIG. 1, shown is a simplified block diagram of a system including cryptographic module 10, for instance a PCMCIA card, for supporting a plurality of client stations according to the present invention. The cryptographic module 10 is inserted within a module housing 11, for instance a PCMCIA card reader, that is in electrical communication with a local area network (LAN) 15. Also in communication with the LAN 15 is a plurality of client stations 20, for example computer workstations, each client station 20 having a unique authentication for communicating with the cryptographic module 10.

Figure 2:
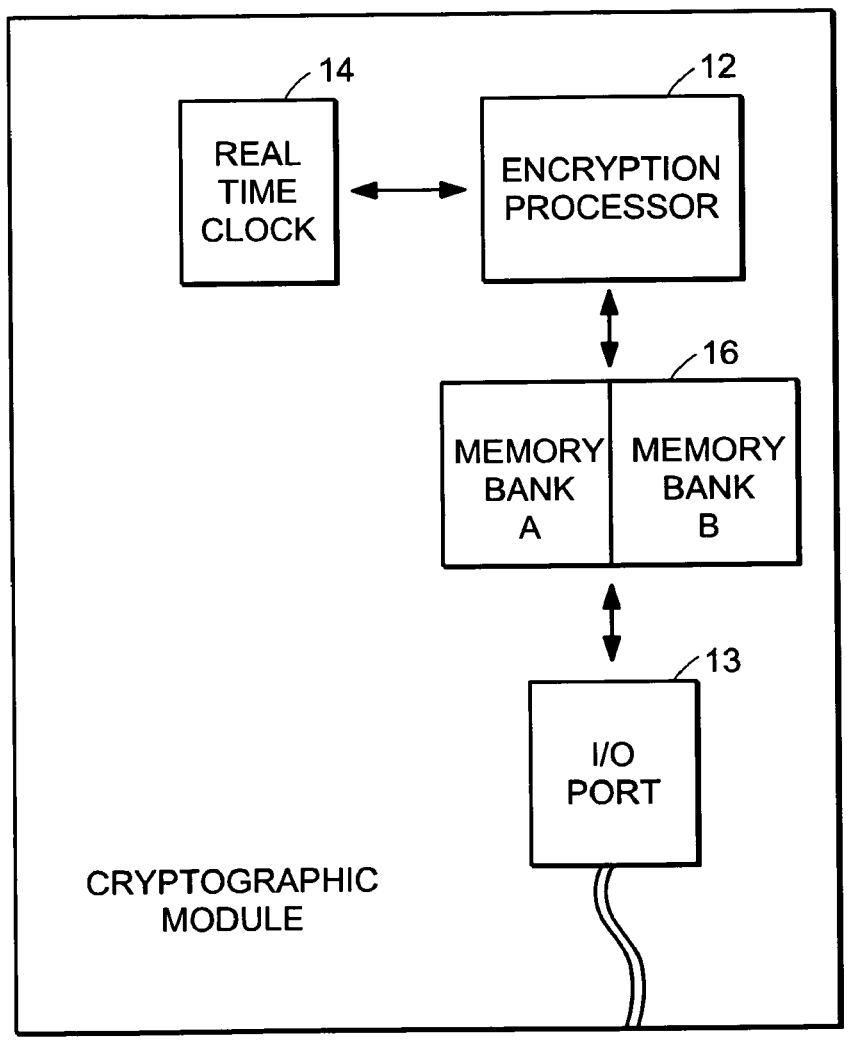
FIG. 2 shows a simplified block diagram of a cryptographic module including an encryption processor and a dual-ported memory circuit according to the present invention.

Referring to FIG. 2, a simplified block diagram of the cryptographic module 10 is shown. An encryption processor 12 for executing encryption algorithms is embodied on the module 10. The encryption processor 12 is in electrical communication with a memory circuit 16 having two memory banks, shown in FIG. 2 as bank A and bank B. The memory circuit 16 is for storing temporarily data that is ready for processing by the encryption processor 12, and for storing temporarily the processed data that is returned by the encryption processor 12. The module 10 has an input/output port 13 for mating with a corresponding port of the module housing 11. The input/output port 13 is in communication with the memory circuit 16 and with a communications bus (not shown) of the module housing 11 for transferring data between the LAN and the memory circuit 16. A real time clock 14 is also in communication with encryption processor 12 for providing a local time value to the encryption processor 12. Optionally, the encryption processor 12 performs time-stamping functions using the local time value provided by real time clock 14. Of course, other hardware configurations are known and optionally are used.

In the present example the encryption processor 12 includes a plurality of processing stages (not shown) arranged in a serial array. The array defines a pipeline processor, having a forward processing path and a return processing path. In use, each client station 20 of the plurality of client stations writes data to an available data bank. The encryption processor 12 reads the data that is ready for processing from a filled memory bank, for example bank A, as a series of blocks or subsets of the data, each block of data having a predetermined length. The blocks of data are provided time-sequentially to a first processing stage of the serial array, which processing stage performs a same first mathematical operation on each block of data that is provided thereto. In turn, each block of data propagates in a step-by-step fashion from one processing stage to a next processing stage in a forward processing path along the serial array. At each step, there is a processing stage that performs a same mathematical operation on each block of data that is provided thereto. Simultaneously, a result that is calculated at each processing stage is provided to a previous processing stage of the serial array with respect to a return processing direction, which results comprise in aggregate the processed data returned by the encryption processor. Optionally, the encryption processor 12 is a pipeline processor having only a forward path.

Advantageously, the number of processing cycles required to perform an n-bit encryption operation is reduced to a predetermined number of cycles due to the efficient use of processing resources within a bi-directional pipeline processor. Further advantageously, during the final few processing cycles no new additional blocks of data are being read from memory bank A, data is only stored therein. During the period of time when no new additional blocks of data are being read from memory, encryption processor 12 is able to simultaneously examine a "go-bit" value of a second memory bank, for example bank B, to determine one of a "go" and a "no-go" status thereof. If the "go-bit" is set to a "go" value, then the encryption processor 12 immediately begins processing the data that is written into bank B once it is finished writing the processed first data to bank A. Of course, when the encryption processor 12 is implemented in custom hardware, the "go-bit" is optionally coupled to the processor via gating circuitry to indicate that a next data bank is prepared for processing, absent the encryption processor 12 polling any data banks. Further, when more than two data banks are implemented, the hardware preferably indicates which bank to process next. Having the "go-bit" coupled directly via gating circuitry to the encryption processor 12 obviates the need for the encryption processor 12 to determine the "go-bit" value, since a signal is sent continuously to the encryption processor 12 indicating the status of the data bank.

Figure 3A:
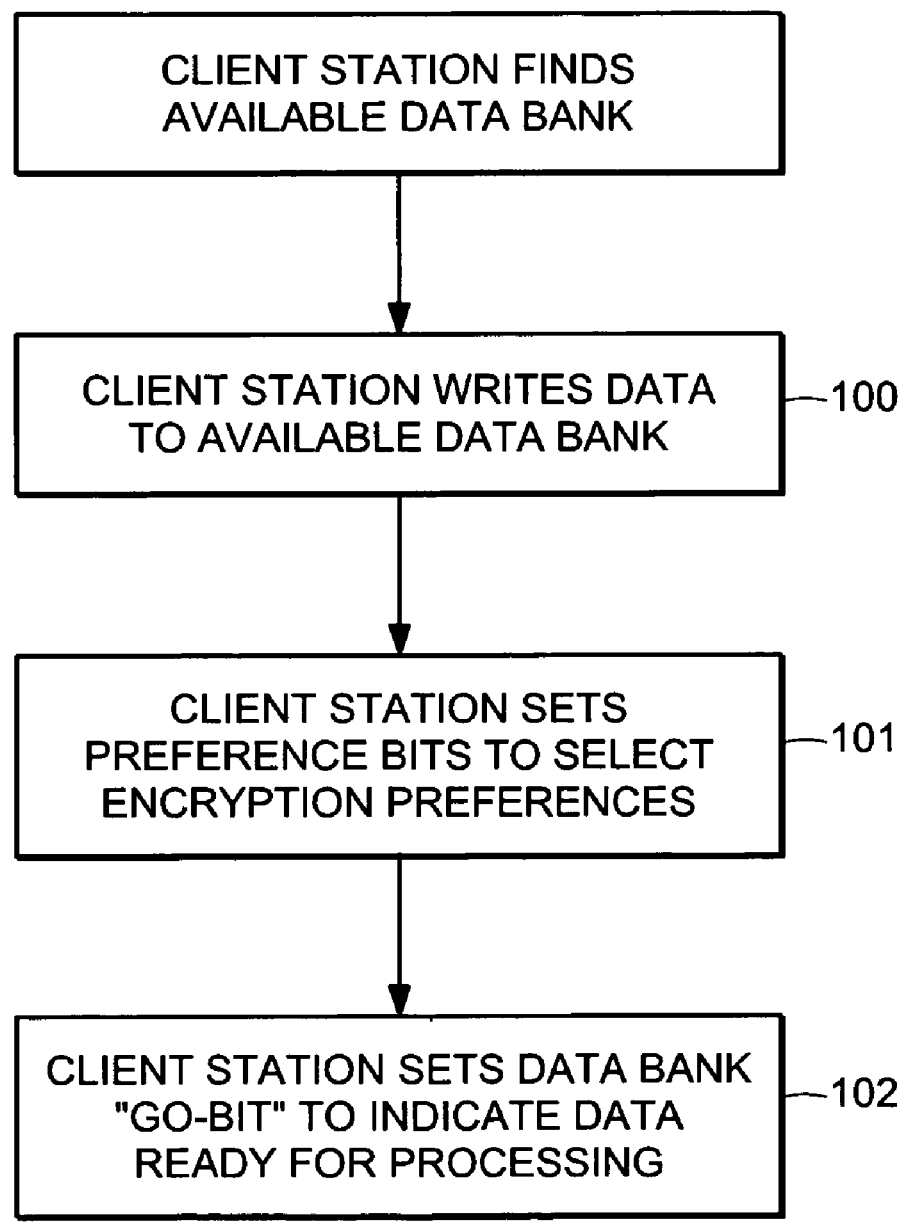
FIG. 3a shows a simplified flow diagram of a method according to the present invention for allowing a client station of the plurality of client stations of FIG. 1 to provide electronic data to the cryptographic module of FIG. 1 for processing thereby.

Referring to FIG. 3a, shown is a simplified flow diagram of a method for a client station 20 to provide data for processing by an encryption processor 12 that is shared between a plurality of substantially similar client stations. At step 100 a client station 20 finds an available data bank that is completely empty and ready to receive data for processing. The client station optionally searches one of a set of data banks that are shared between the plurality of client stations, and a set of data banks that are dedicated to that client station only. At step 101 the client station writes data, for example a hashed version of a document, to the available data bank. In the present invention the data banks are "filled" when a complete "message" or data stream is loaded by the client station 20. Optionally when the data is completely written to the data bank, the client station 20 sets, at step 102, a predetermined number of "preference bits". Each "preference bit" is set to a value that is indicative of a preference for a particular option, the options being used for processing the written data in a particular manner. Processing preferences include, for example, selecting a particular private key identifier identifying a private key to be used for encryption when more than one encryption key is available and selecting an operation to be performed on the data, such as encryption and/or time-stamping. Of course, the preferences could be stored before the other data or in parallel thereto. The "go" state of the data bank becomes activated at step 103 when client station 20 sets the data bank "go-bit" to a "go" value, after the particular data stream is loaded and the preference bits are set. Preferably, the "go" value is the last value stored within a bank by a client processor since the encryption processor may begin processing of data within the bank at any time after the "go" value is stored therein.

Figure 3B:
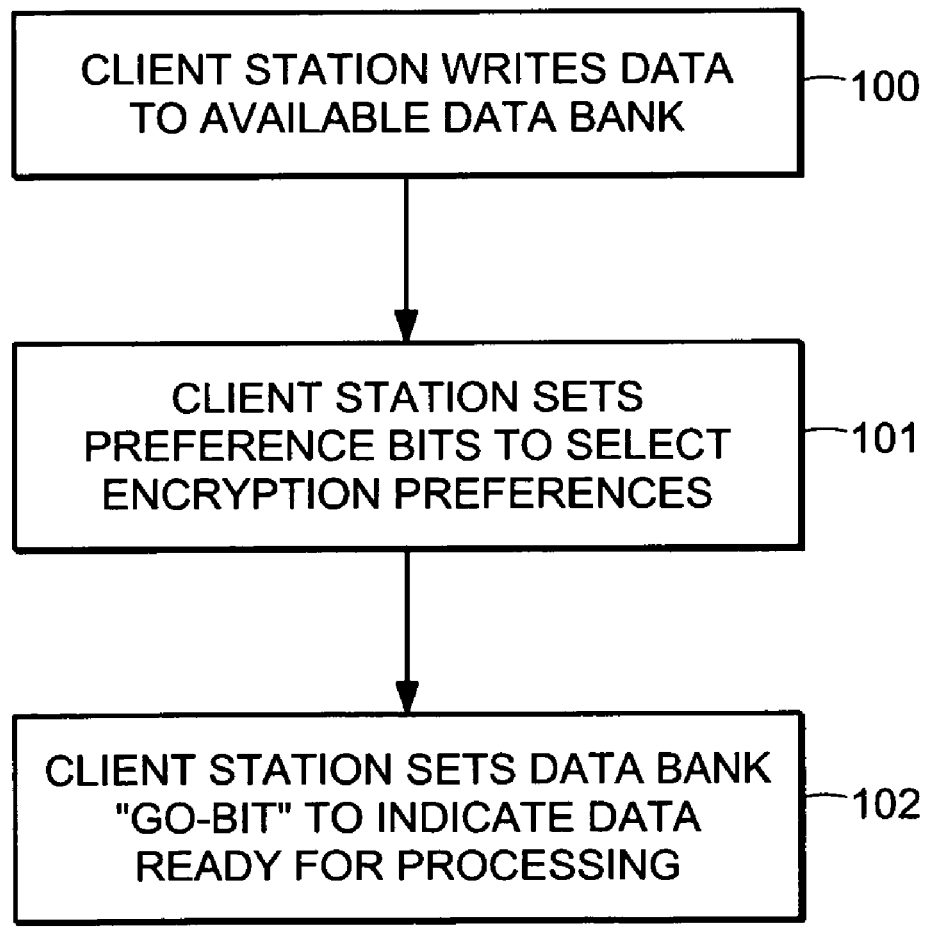
FIG. 3b shows a simplified flow diagram of another method according to the present invention for allowing a client station of the plurality of client stations of FIG. 1 to provide electronic data to the cryptographic module of FIG. 1 for processing thereby.

Referring to FIG. 3b, shown is a simplified flow diagram of an alternate method for a client station 20 to provide data for processing by an encryption processor 12 that is shared between a plurality of substantially similar client stations. The method of FIG. 3b is optionally implemented when a particular client station has only one dedicated data bank available for writing data for processing by the shared encryption processor 12. At step 100 the client station writes data, for example a hashed version of a document, to the available data bank. Optionally, when the data is completely written to the data bank the client station 20 sets, at step 101, a predetermined number of "preference bits". Each "preference bit" is set to a value that is indicative of a preference for a particular option, the options being used for processing the written data in a particular manner. Processing preferences include, for example, selecting a private key from available private keys and identified via identifiers to be used for encryption when more than one encryption key is available and selecting an operation to be performed on the data, such as encryption and/or time-stamping. The "go" state of the data bank becomes activated at step 102 once the particular data stream is loaded and preference bits are set.

Figure 4A:
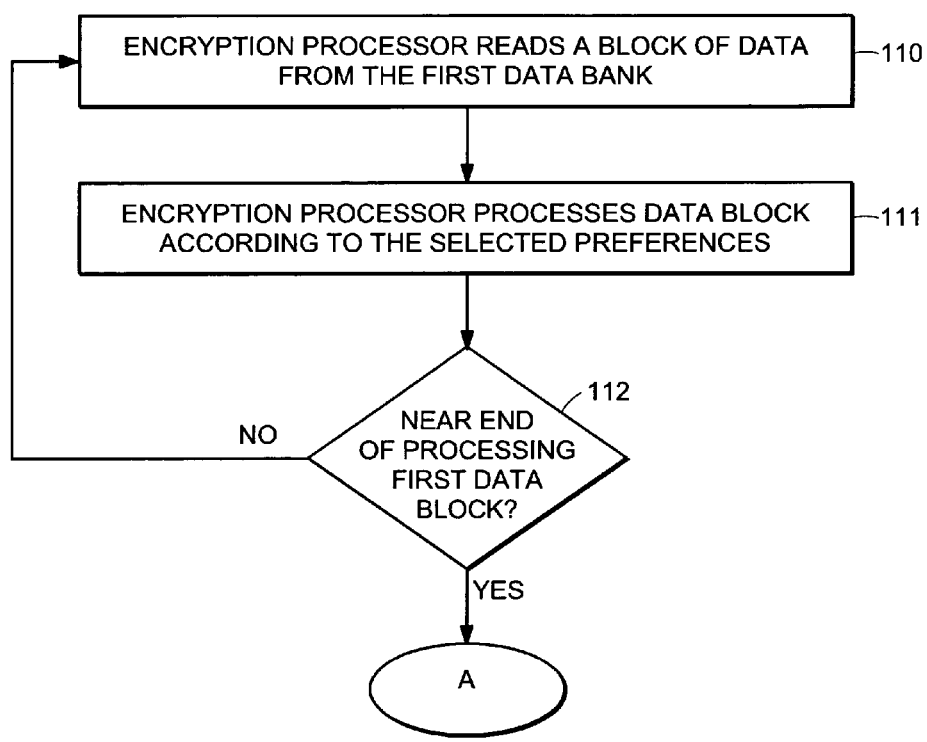

Referring to FIGS. 4a and 4b, shown is a method for allocating the processing resources with improved efficiency of an encryption processor 12 that is shared between a plurality of client stations, the client stations being in communication with the encryption processor 12 via a LAN. At step 110 the encryption processor begins reading data for processing from a first data bank, for example data bank A of FIG. 2. The encryption processor 12 begins processing the data, for example a hashed version of a document, at step 111 according to a predetermined algorithm and the processing preferences that were set by the client station 20 at step 101 of FIG. 3a or 3b. At step 111 the data is provided to a first processing stage of the encryption processor 12 as a stream of data blocks, each data block having a predetermined length and comprising a part of the total of data. At some point during the processing of the data, represented in FIG. 4a at decision step 112, the end of the data stream is read from data bank A and no new additional data is being provided to the first processing stage of the serial array of encryption processor 12. Of course, the encryption processor 12 is still actively processing the final data blocks of the data stream and writing the processed data into a data bank, for example data bank A. Advantageously, in the present system the encryption processor 12 anticipates the end of the processing cycle in advance of the data being completely processed and written to a data bank.

Referring now only to FIG. 4b, when the encryption processor is other than reading new data from data bank A, the encryption processor 12 reads at step 113 a "go-bit" value of a second data bank, for example data bank B of FIG. 2. Step 113 is performed in parallel with processing step 114, making the present method highly efficient in terms of the processing resources that are expended, for instance by the encryption processor 12. If at decision step 116 the encryption processor 12 is also finished processing and writing the data from data bank A, then at step 117 the encryption processor 12 sets a separate "ready-bit" within data bank A that is indicative of processed data being contained therein. The "readybit" is a flag value that is set by the encryption processor 12 to indicate that the data provided by the client station 20 is processed and ready to be read out of the data bank, A. For example, after the client station 20 writes data to a data bank for processing by the encryption processor 12, the client station 20 polls periodically the ready bit of the data bank to determine one of a status of "ready" to be read out and "not-ready" to be read out. Alternatively, the "ready" value is coupled via ready gating circuitry to automatically result in transmission of an indication to at least the appropriate client processor in response to the "ready" value being stored in the memory. Encryption processor 12 immediately establishes at step 118 an electrical communication with data bank B to read data for processing therefrom, and the method of FIG. 4b is terminated at step 121.

Alternatively, after determining at step 115 that a "go-bit" of data bank B is set to a "go" value, the encryption processor 12 continues processing and writing the data from data bank A at step 114. At step 117 the encryption processor 12 sets the separate "ready-bit" within data bank A that is indicative of processed data being contained therein. Encryption processor 12 then immediately establishes at step 118 an electrical communication with data bank B to read data for processing therefrom, and the method of FIG. 4b is terminated at step 121. In this way, there are no "lost" or extraneous encryption processor processing cycles during which encryption is other than performed unless there are no "jobs" waiting in the memory buffer.

Of course, if the data bank B "go-bit" value is indicative of other than a "go" status at decision step 115, then encryption processor 12 continues to check the data banks "go-bit" value until it detects a "go-bit." Alternatively, when more than two banks exist, the processor checks all banks for the presence of a set "go-bit." When more than two banks exist, the processor continues to check the "go-bit" in each bank until a set "go-bit" is found. If at decision step 116 the encryption processor 12 is also finished processing and writing the data from data bank A, then at step 117 the encryption processor 12 sets a "ready-bit" within data bank A indicative of processed data therein. Alternatively, the encryption processor 12 continues processing the data at step 114. Encryption processor 12 immediately establishes at step 118 an electrical communication with data bank B to read data for processing therefrom. The method of FIG. 4b is terminated at step 121.

Further alternatively, the encryption processor 12 other than determines a "go-bit" value at step 115 which is indicative of a "go" status for data bank B prior to finishing the steps of processing and writing the data from data bank A at step 119. This leads immediately to the encryption processor 12 setting at step 120 a "ready-bit" within data bank A indicative of processed data therein. The method of FIG. 4b is terminated at step 121.

Preferably, the "go-bit" value is provided to the encryption processor through gating logic, which provides as an output thereof the next bank to be processed. In this fashion, the encryption processor need only receive the gated value immediately prior to completing processing of current data in order to establish that further data is to be processed in the subsequent cycle or not.

Figure 4C:
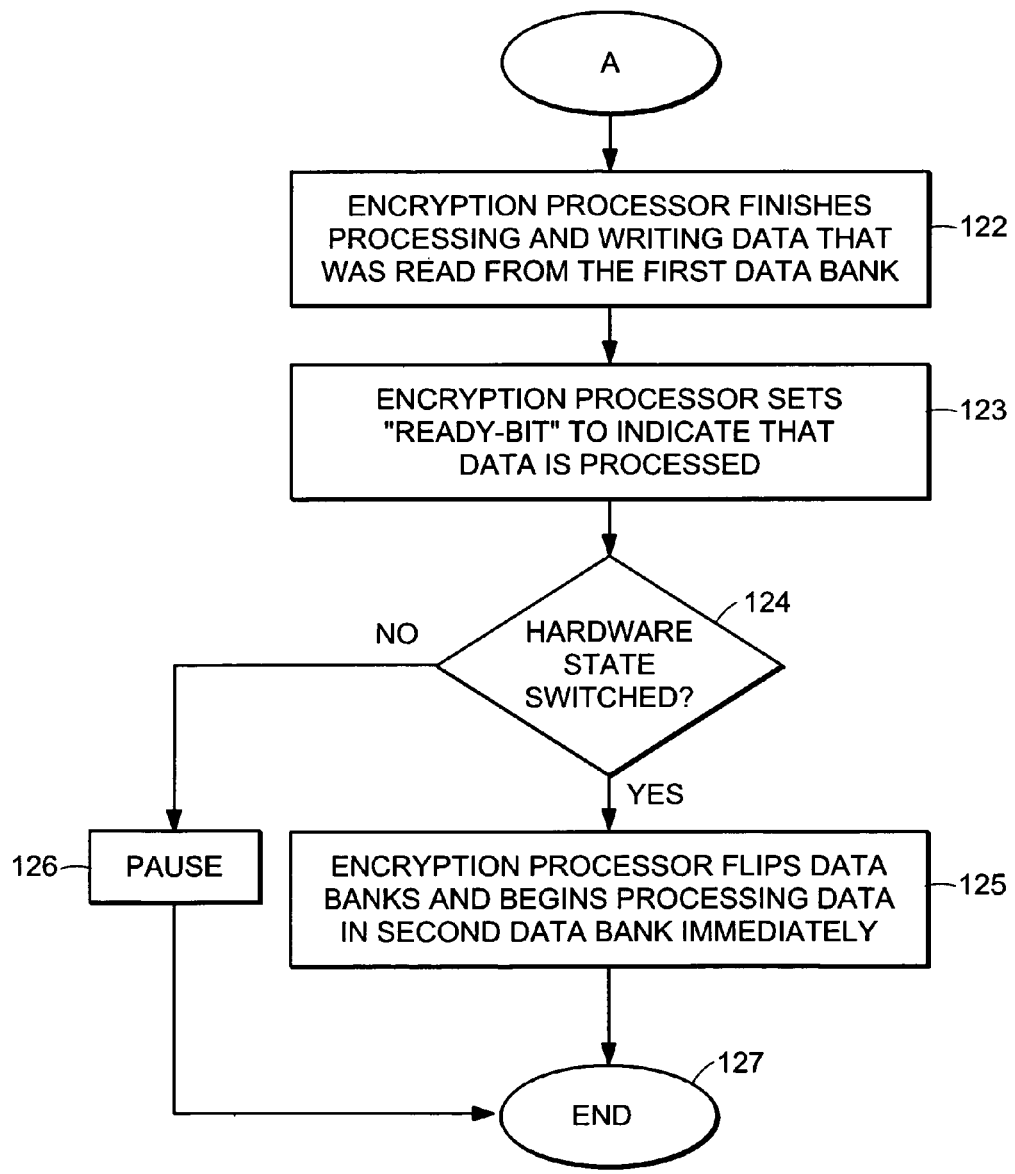

Referring now to FIGS. 4a and 4c, shown is a method for allocating the processing resources with improved efficiency of an encryption processor that is shared between a plurality of client stations, the client stations being in communication with the encryption processor via a LAN. In the present example the encryption processor 12 is implemented in custom hardware, such that the "go-bit" is coupled to the encryption processor 12 to indicate that a next data bank is prepared for processing absent the processor polling other data banks. At step 110 the encryption processor begins reading data for processing from a first data bank, for example data bank A of FIG. 2. The encryption processor 12 begins processing the data, for example a hashed version of a document, at step 111 according to a predetermined algorithm and any processing preferences that were set by the client station 20 at step 102. At step 111 the data is provided to a first processing stage of the encryption processor 12 as a stream of data blocks, each data block having a predetermined length and comprising a part of the total data. At some point during the processing of the data, represented in FIG. 4a at decision step 112, the end of the data stream is read from data bank A and no new additional data is being provided to the first processing stage of the serial array of encryption processor 12. Of course, the encryption processor 12 is still actively processing the final data blocks of the data stream and writing the processed data into a data bank. Advantageously, the encryption processor 12 anticipates the end of the processing cycle in advance of the data being completely processed and written to a data bank.

Referring now to FIG. 4c, the encryption processor 12 finishes processing and writing the data from data bank A at step 122, and sets at step 123 a "ready-bit" within data bank A indicative of processed data therein. The "ready-bit" is a flag value that is set by the encryption processor 12 to indicate that the data provided by the client station 20 is processed and ready to be read out of the data bank, A. For example, after the client station 20 writes data to a data bank for processing by the encryption processor 12, the client station 20 polls periodically the ready bit of the data bank to determine one of a status of "ready" to be read out and "not-ready" to be read out. Absent a polling signal, the encryption processor 12 determines a hardware state at decision step 124 that is one of either "switch" or "no-switch". When a "switch" status is determined, encryption processor 12 immediately establishes at step 125 an electrical communication with data bank B to read data for processing therefrom. The method of FIG. 4c is terminated at step 127. Alternatively, when a "no-switch" status is determined at decision step 124, encryption processor 12 enters an inactive or "pause" state, in dependence upon receiving a signal that is indicative of a hardware "switch" status.

Figure 5A:
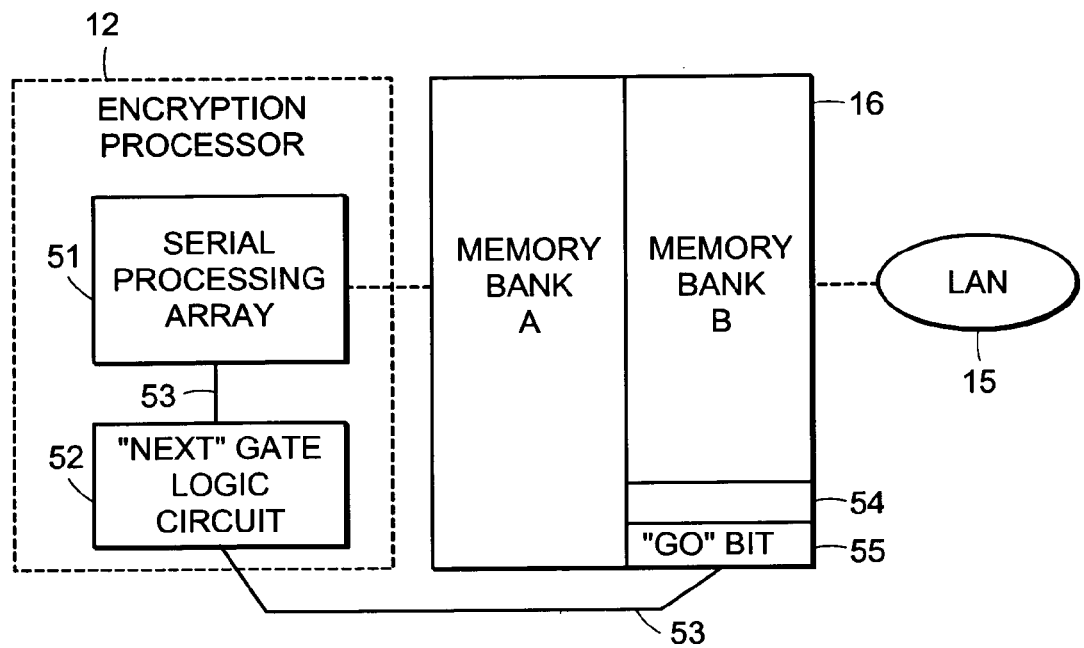
FIG. 5a shows a simplified block diagram of a custom hardware implementation according to the present invention in a first state.
Figure 5B:
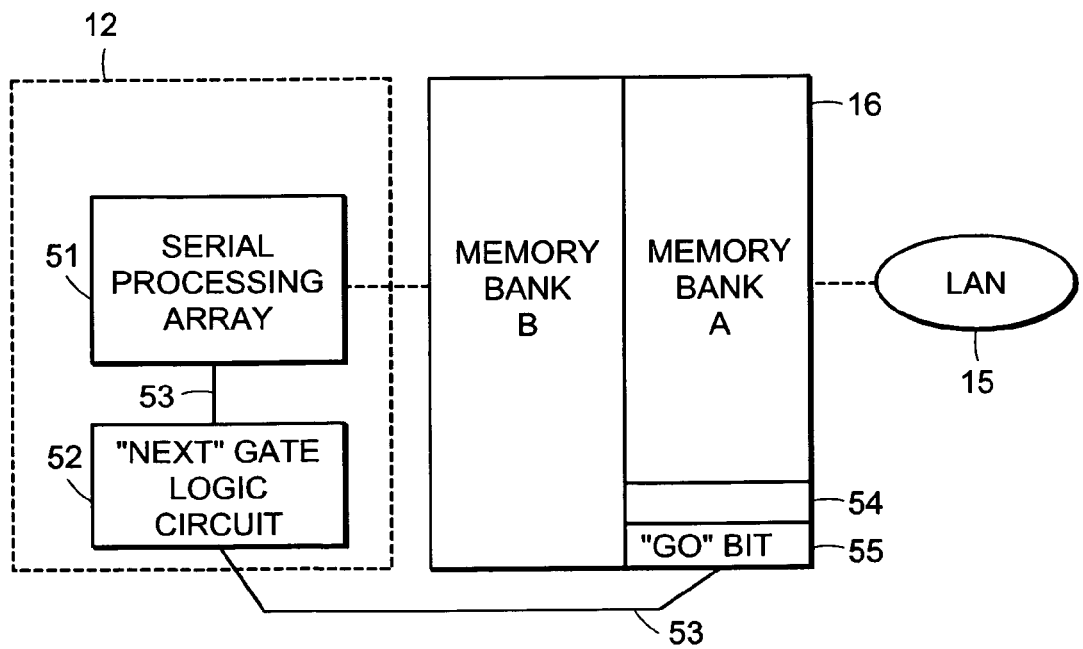
FIG. 5b shows a simplified block diagram of the custom hardware implementation of FIG. 5a in a second state, according to the present invention.

Referring to FIGS. 5a and 5b, shown is a simplified block diagram of a preferred embodiment of a custom hardware implementation in a first state and in a second state, respectively, according to the present invention. The encryption processor 12 includes a serial processing array 51 that is in electrical communication with a first data bank, A, of the memory circuit 16. As shown in FIG. 5a, only the encryption processor writes data to or reads data from the data bank A in the first state. The encryption processor 12 is also in electrical communication with a "next" gate-logic circuit 52 via an electrical connection 53. The "next" gate-logic circuit 52 is also in electrical communication via the electrical connection 53 with a "go-bit" 55 of a second data bank, B, of the memory circuit 16. As shown in FIG. 5a, only a client station connected to the LAN 15 writes data to or reads data from the data bank B in the first state.

In use, and as shown schematically in FIG. 5a, a client station 20 provides data for processing to data bank B, and when the data is completely loaded and any preference bits are set, client station 20 sets the "go-bit" to a "go" value. When encryption processor 12 finishes a current processing operation and has written the processed data to data bank A, "next" gate logic circuit 52 provides a signal indicative of the data bank B "go" status thereto. As shown schematically in FIG. 5b, encryption processor 12 immediately switches the data banks, for example encryption processor 12 establishes electrical communication with data bank B and makes data bank A available to the client station 20 that is connected via the LAN. Advantageously, encryption processor 12 receives the signal from "next" gate logic circuit 52 absent a polling signal being sent to the data bank. As soon as a final processing cycle in the encryption processor 12 is completed, the encryption processor 12 immediately connects to a data bank in which the "go-bit" is in a "go" state. Further advantageously, when more than two data banks are implemented, this system avoids the encryption processor 12 having to search among the data banks for one which is loaded. Of course, a two data bank system is optimised for use with a single client processor having a client processor accessible data bank and an encryption processor accessible data bank at any given time. Alternatively, both data banks are accessible simultaneously unless one is currently being processed by the encryption processor.

The present system offers distinct advantages over the prior art systems, the prior art systems requiring an exchange of at least a polling signal to determine a next data bank having data for processing. It is therefore a first advantage of the present system that the need for an exchange of polling signals between the encryption processor 12 and each client station 20 of the plurality of client stations is obviated. As previously disclosed, the exchange of polling signals accounts for up to 10% of the total processing resources of the encryption processor 12. Obviously, a similar amount of processing resources are made available in the system according to the present invention for performing more valuable processing functions, such as for example encryption and time-stamping.

It is a second advantage of the system according to the present invention that, since the need to exchange polling signals between the encryption processor 12 and each client station 20 of the plurality of client stations is obviated, the total volume of network traffic on the LAN is reduced accordingly. Advantageously, the communications "bottle-necks" that often occur when network traffic volume is close to the system capacity are alleviated or eliminated entirely. Further advantageously, existing communications systems are optionally expanded to include a greater number of client stations without the need to perform expensive upgrades, since the total volume of network traffic is increased minimally.

Finally, it is a third advantage of the system according to the present invention that the latency between a first encryption process ending and a second encryption process starting, for example, is reduced. When encryption processor finishes processing a set of data, it immediately determines a "go-bit" value of a other data bank and knows whether it is going to process the data within the other bank or not, such that there is no latency. Of course, this latency is a disadvantage of the prior art systems, which arises due to the time that is required for the encryption processor to write the processed data into a databank and the time that is required for a client station to safely read the data out of the data bank. In particular, the encryption processor of a prior art system must finish writing the processed data to a data bank before the client station can begin to read the processed data out of the data bank.

Typically an encryption processor performs an encryption operation using one fixed number of bits. Then, to encrypt 40 bits or 128 bits, for example, two separate encryption processors are required. In use, a client station selects an appropriate one of the plurality of encryption processors in dependence upon a particular encryption operation that is requested. Of course, alternatively a single encryption processor is provided which embodies a plurality of processors, each processor for encrypting with a different predetermined number of bits, or a processor is provided which can perform encryption operations using any number of bits. In such a case, the advantages of the system according to the present invention become even more significant. By way of illustration a specific example is given. An encryption processor of a large financial institution is capable of performing encryption operations using any number of bits. The encryption processor performs 512-bit encryption operations 80% of the time; however, there are periods of time processed by the encryption processor. Then in a prior art system, during these periods of time the financial institution is incurring a loss of up to 10% of its encryption processor ability. The loss is due to the need to exchange polling signals between the encryption processor and the client stations. Advantageously, in the system according to the present invention the allocation of encryption processor resources, during the periods of time when hundreds of data packets for 40-bit encryption are being processed, remains consistently high. This consistency is achieved because the encryption processor always knows which data bank it will process next, and it knows this information before it has finished processing the previous data bank, such that any latency is eliminated. Of course, an encryption processor for performing encryption operations using a variable number of bits is easily implemented in the bi-directional pipe-line processor that was described previously.

Numerous other embodiments may be envisaged without departing from the spirit or scope of the invention.

What is claimed is:

1. A system for encrypting data comprising:
a single multistage pipe-line encryption processor including a processor array of serial encryption processing stages configured to serially process independent blocks of data; and,
a memory circuit in electrical communication with the processor array, the memory circuit including:
a first data storage area and a second data storage area for storing independent blocks of data for independent serial processing in the encryption processor;
a first status indicator storage location in each data storage area for storing a status indicator value for indicating that an independent block of data stored within the data storage area is ready for processing by the processor array, the status indicator value operable by a client station; and a second status indicator storage location in each data storage area for storing a status indicator value for indicating completion of processing of an independent block of data stored within the data storage area, the second status indicator value operable by the encryption processor;

the memory circuit successively switching from a first mode to a second mode relative to the processor array, such that in a first mode the first data storage area is available to the encryption processor for processing a block of data and the second data storage area is available to a client station, and in the second mode the second data storage area is available to a client station and the first data storage area is available to the encryption processor for processing a block of data, wherein prior to completing the serial processing of the current data within the first data storage area, the processor array determines a status of an indicator value within the first status indicator storage location for the second data storage, such that in use upon completion of processing the current data within the first data storage area and absent communication external to the encryption processor, the processor array immediately begins a subsequent serial processing operation of a subsequent independent block of data within the second data storage area in dependence upon the first indicator value in the second data storage area.

2. The system according to claim 1 wherein the indicator value is a bit.

3. The system according to claim 1 wherein the data storage area is a data bank.

4. The system according to claim 3 wherein a client station is in operative communication with the second data bank other than the data bank containing data currently being processed, for writing data to and from the second data bank.

5. The system according to claim 1 wherein the status indicator value in each data storage area is electrically coupled to a hardware selector for providing an electrical signal to the processor array, the electrical signal indicative of a next data storage area of data that is ready to be processed by the processor.

6. The system according to claim 5 comprising a next gate-logic circuit disposed between the processor array and the status indicator value in each data storage area, the next gate-logic circuit for, in use, receiving an electrical signal from a data storage area other than the data storage area data within which is currently being processed and for providing said electrical signal to the processor array at the end of a processing cycle.

7. The system according to claim 1 comprising at least one preference value in each data storage area, the at least one preference value operable by the client station between a first position and a second position for indicating a predetermined processing preference of the client station.

8. The system according to claim 7 comprising a second different storage location for storing a second different status indicator value within each data storage area, the second different status indicator value operable by the processor array between a first position and a second position for indicating that the processing of data within the data storage area is complete.

9. A method for allocating resources of an encryption processor the method comprising:

writing an independent block of subsequent data to a first data storage area from a first client station;

setting a first status indicator value in the first data storage area by providing a value from the client station for indicating that the subsequent data in the first data storage area is ready for processing;

checking the first status indicator value in the first data storage area immediately before the processor is finished processing an independent block of current data in a second data storage area, to determine a set value thereof;

connecting a serial encryption processor to the first data storage area for processing the subsequent data therein immediately after the encryption processor has completed processing the current data in the second data storage area, absent communication external to the encryption processor and in dependence upon the first status indicator value in the first data storage area being set to a value indicative of a ready status;

writing processed data from the encryption processor to the first data storage area;

setting a second status indicator value in the first data storage area by providing a value from the encryption processor, the second status indicator value indicative of processed data therein; and the setting, checking, and connecting resulting in successive switching between a first mode and a second mode by the processor array, such that in a first mode the first data storage area is available to the encryption processor and the second data storage area is available to a client station, and in the second mode the first data storage area is available to a client station and the second data storage area is available to the encryption processor.

10. The method according to claim 9 wherein the encryption processor is coupled to the status indicator value in the first data storage area via gating logic.

11. The method according to claim 10 wherein the gating logic provides a signal to the encryption processor indicative of a next data storage area having data that is ready for immediate processing thereof.

12. The method according to claim 9 wherein the encryption processor polls the status indicator value in the first data storage area to determine a set value thereof.

13. The method according to claim 12 comprising, prior to the step of setting a first status indicator value, the step of:

setting at least a separate preference value in the first data storage area by providing a value from the client station for indicating at least a processing preference of the client station.

* * * * *